(12) United States Patent
Dreyfoos et al.

(10) Patent No.: US 9,026,862 B2
(45) Date of Patent: May 5, 2015

(54) PERFORMANCE MONITORING FOR APPLICATIONS WITHOUT EXPLICIT INSTRUMENTATION

(76) Inventors: Robert W. Dreyfoos, Kirkland, WA (US); Jason Carl Hendrickson, Seattle, WA (US); Brian D. Wentz, Granada (ES); Prashant Ratanchandani, Sammamish, WA (US); Pavan Kumar Josyula Venkata, Redmond, WA (US)

( * ) Notice: Subject to any disclaimer, the term of this patent is extended or adjusted under 35 U.S.C. 154(b) by 850 days.

(21) Appl. No.: 12/959,217

(22) Filed: Dec. 2, 2010

(65) Prior Publication Data

US 2012/0144246 A1 Jun. 7, 2012

(51) Int. Cl.
*G06F 11/00* (2006.01)
*G06F 11/30* (2006.01)
*G06F 11/07* (2006.01)
*G06F 11/34* (2006.01)

(52) U.S. Cl.
CPC ........ *G06F 11/3089* (2013.01); *G06F 11/0748* (2013.01); *G06F 11/0754* (2013.01); *G06F 11/302* (2013.01); *G06F 11/3065* (2013.01); *G06F 11/3409* (2013.01); *G06F 11/3466* (2013.01); *G06F 2201/86* (2013.01); *G06F 2201/865* (2013.01)

(58) Field of Classification Search
CPC G06F 11/302; G06F 11/3051; G06F 11/3055
USPC .............. 714/47.1, 47.3, 38.1, 38.14
See application file for complete search history.

(56) References Cited

U.S. PATENT DOCUMENTS

| | | | | |
|---|---|---|---|---|
| 5,872,976 | A * | 2/1999 | Yee et al. ........................ | 717/127 |
| 6,002,872 | A * | 12/1999 | Alexander et al. ............. | 717/127 |
| 7,483,810 | B2 * | 1/2009 | Jackson et al. ................. | 702/176 |
| 7,523,198 | B2 * | 4/2009 | Wu et al. ........................ | 709/224 |
| 7,716,647 | B2 * | 5/2010 | Loh et al. ....................... | 717/127 |
| 7,797,587 | B2 * | 9/2010 | Vasudevan et al. ........... | 714/47.1 |
| RE43,154 | E * | 1/2012 | Gross et al. ..................... | 714/39 |
| 8,136,124 | B2 * | 3/2012 | Kosche et al. ................. | 719/318 |
| 8,161,323 | B2 * | 4/2012 | Kuchibhotla et al. ........... | 714/25 |
| 8,184,546 | B2 * | 5/2012 | Denby et al. ................... | 370/250 |
| 8,230,433 | B2 * | 7/2012 | Chiu et al. ..................... | 718/104 |
| 8,301,937 | B2 * | 10/2012 | Joy et al. ..................... | 714/38.12 |
| 8,381,036 | B2 * | 2/2013 | Vidal et al. ................... | 714/38.1 |
| 2005/0283457 | A1 * | 12/2005 | Sonkin et al. .................... | 707/1 |
| 2010/0153069 | A1 * | 6/2010 | Giese et al. .................. | 702/186 |

OTHER PUBLICATIONS

Creating Custom Instruments with DTrace—Published Date: Jul. 9, 2010 http://developer.apple.com/mac/library/documentation/DeveloperTools/Conceptual/InstrumentsUserGuide/CreatingaCustomInstrument/CreatingaCustomInstrument.html.

(Continued)

*Primary Examiner* — Joshua Lohn
(74) *Attorney, Agent, or Firm* — John Jardine; Kate Drakos; Micky Minhas

(57) ABSTRACT

Systems and methods for monitoring operational performance of at least one application containing no explicit instrumentation are described. Data relating to the operational performance of the application can be obtained and provided to a telemetry server for analysis without the use of diagnostic instrumentation within the application. Generic and targeted performance data can be obtained using responsiveness components within a computing operating system.

20 Claims, 5 Drawing Sheets

(56) References Cited

OTHER PUBLICATIONS

Application Analytics and Browsing Forks—Published Date: May 6, 2010 http://blogs.msdn.com/b/codeplex/archive/2010/05/06/application-analytics-and-browsing-forks.aspx.

Garbervetsky et al., Program Instrumentation and Run-Time Analysis of Scoped Memory in Java—Published Date: Mar. 2004 http://www-verimag.imag.fr/~yovine/articles/rv04.pdf.

Demay et al., Software Instrumentation for the Detection of Attacks on Non-control-data—Published Date: Sep. 30, 2009 http://www.rennes.supelec.fr/RAID2009/slides/poster2.pdf.

Carrera et al., An Instrumentation Tool for Threaded Java Application Servers—Published Date: Sep. 2002 http://www.bsc.es/media/393.pdf.

Details of Profiling—Published Date: Jul. 29, 2007 http://www.ipp.mpg.de/~dpc/gnu/gprof-2.9.1/html_chapter/gprof_9.html.

* cited by examiner

PERFORMANCE MONITORING FOR APPLICATIONS WITHOUT EXPLICIT INSTRUMENTATION

BACKGROUND

Applications or software designed for operation on processors may, in some instances, perform unsatisfactorily, e.g., hang or take an unusually long time in responding to a user's input. The unsatisfactory performance may be due to computer code of the application itself, or may be due to the computing environment in which the application operates. Unsatisfactory or slow performance can be unpleasant for a user, and in some cases result in diversion to another application, a restarting of the application, or a rebooting of a computing system.

Efforts have been made to analyze performance of some software applications as a plurality of the applications are placed in operation on a plurality of computing systems. For some methods of analysis, explicit instrumentation or probes comprising additional segments of software code are included in the application. Typically, the instrumentation is placed at the "start" and "end" of selected sequences or scenarios executed by the application. The explicit instrumentation provides means to monitor the performance of an application as it operates, and produce a record that includes information about the application as it operates. Should the application behave in an undesirable or unexpected manner for an instrumented scenario, information from the record can be retrieved for subsequent analysis of the scenario.

The paradigm of application-performance analysis via explicit instrumentation requires additional code, e.g., specific instrumentation, to be added at selected locations in the code of the application. The developer of the application may be the only entity that knows the targeted sequences or scenarios of the instrumentation, and what the information provided by the instrumentation means. Further, a developer would not easily be able to analyze the performance of non-instrumented applications, e.g., applications designed by third parties to operate in conjunction with a developer's application.

SUMMARY

The present invention provides methods and systems for measuring performance of one or more applications placed in operation on one or a plurality of computing systems without use of explicit instrumentation in the applications. The applications may be in operation on at least one processor in conjunction with an operating system (OS). The at least one processor may be in communication with a telemetry server, and provide performance measurement data for the one or more applications to the telemetry server for analysis.

In various embodiments, core responsiveness elements operating on the at least one processor in conjunction with the operating system for the at least one processor provide response events to a performance monitor. The response events may comprise information about a selected application's responsiveness to an input from a user or input from another application, e.g., information about the amount of time it takes for an application to respond to an input. The performance monitor may process the response events to determine whether a response event is indicative of unsatisfactory performance of an application. If it is found that a response event is indicative of unsatisfactory performance, the event may be reported to a telemetry server for further analysis. The core responsiveness elements and performance monitor may comprise part of an OS infrastructure that may be used to monitor and provide information about an application's performance without the use of explicit instrumentation within the application itself.

Described herein is a core responsiveness element and infrastructure for use in monitoring performance of at least one application. The core responsiveness element may be configured for operation on at least one processor in conjunction with an underlying framework, e.g., an operating system or .NET framework. In various embodiments, the core responsiveness element is external to the at least one application. The core responsiveness element may be adapted to provide at least one response event to an application or a user, wherein the response event comprises data representative of operation performance of the at least one application.

Also described herein is a system for monitoring performance of at least one application that contains no explicit instrumentation. The system may comprise at least one instrumented core responsiveness element external to at least one application. The instrumented core responsiveness element may be configured for operation on at least one processor and further configured to provide at least one response event to a performance monitor, the at least one response event comprising data representative of operational performance of the at least one application. The performance monitor may be configured for operation on the at least one processor, and further configured to receive a plurality of response events from the at least one instrumented core responsiveness element; process the plurality of response events; and provide a notification based on the processing of the plurality of response events. In various embodiments, the notification identifies that the at least one application failed to meet a performance criterion.

Also contemplated is a system for monitoring performance of at least one application. An exemplary embodiment of the system comprises at least one processor adapted for operating with an operating system and at least one application, wherein the at least one application does not include explicit instrumentation for evaluating operational performance of the at least one application. The system further comprises a performance monitor configured for operation on the at least one processor, and at least one core responsiveness element configured for operation on the at least one processor external to the at least one application. In some embodiments, the performance monitor is further configured to receive a plurality of response events from the at least one core responsiveness element, wherein at least some of the plurality of response events comprise information relating to operational performance of the at least one application. The performance monitor may be configured to process the plurality of response events, and provide a first sampling of data. The first sampling of data may comprise a notification identifying at least one event of interest indicating that an application has failed to meet a performance criterion. The performance monitor may be configured to receive a request. The request may include data identifying at least one filter characteristic to be applied by the performance monitor and at least one type of data or information further requested. The performance monitor may be further configured to provide a second sampling of data responsive to the request. The second sampling may comprise data representative of at least one response event from at least one of the plurality of response events relating to the operational performance of the at least one application.

Useful methods may also be carried out in conjunction with the system as described above. In one embodiment, a method for monitoring performance of at least one application in operation on at least one processor comprises acts of receiving, by a performance monitor in operation on the at least one processor, a plurality of response events from at least one core responsiveness element of an operating system external to the at least one application, wherein at least some of the plurality of response events comprise information relating to operational performance of the at least one application, and providing, by the performance monitor, a first sampling of the response events. The first sampling of response events may be provided, for example, to a telemetry server or a self-diagnosis application of a computing system. The method may further comprise receiving, by the performance monitor, a request (e.g., from the telemetry server or self-diagnosis application); receiving, by the performance monitor, additional response events from the at least one core responsiveness element; and providing, by the performance monitor, a second sampling of response events responsive to the request. In various embodiments, the second sampling comprises at least one of the additional response events comprising information relating to the operational performance of the at least one application.

It will be appreciated that the invention may be embodied in a manufactured, non-transitory, computer-readable medium as computer-executable instructions or code. In various embodiments, the instructions are read by at least one processor and adapt the at least one processor to perform method steps as described above, or method steps of alternative embodiments of the invention as described below.

The foregoing and other aspects, embodiments, and features of the invention can be more fully understood from the following description in conjunction with the accompanying drawings. The foregoing is a non-limiting summary of the invention, which is defined by the attached claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

I. Overview

Figure 1:
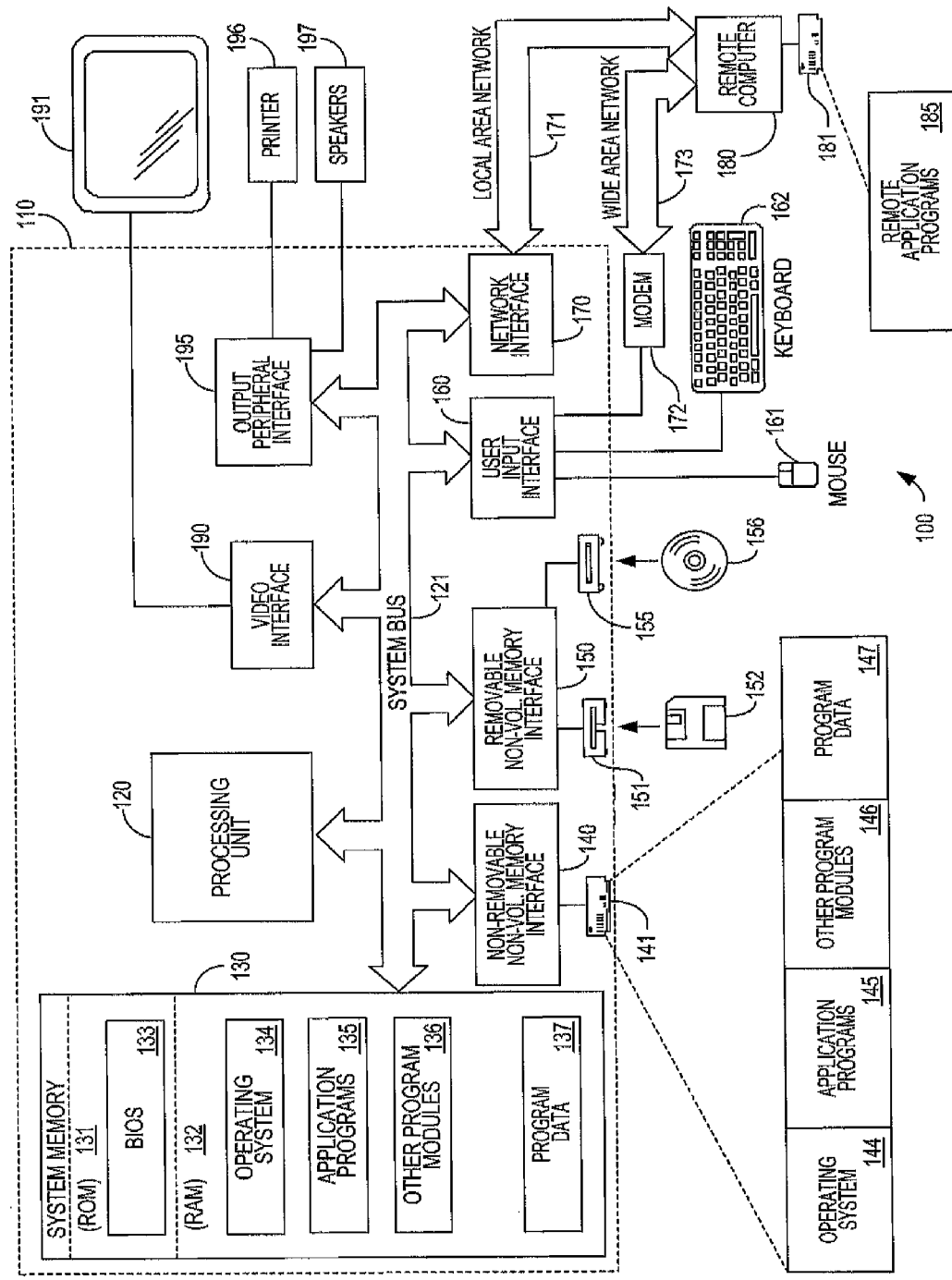
FIG. 1 is a block-diagram representation of an embodiment of a computing system on which embodiments of the present invention may be implemented.

The Applicants have recognized and appreciated that existing methods of monitoring and evaluating performance using instrumented applications have certain limitations. An instrumented application is an application in which segments of code have been added to selected process sequences or scenarios with the application's code so as to provide data indicating how well the selected sequence or scenario performed during operation of the application. In-application instrumentation can be limited in usefulness in several respects.

The term "instrumented application" may be used herein to refer to an application that is adapted with added code to provide operational performance information about the application. The terms "in-application instrumentation" or "explicit instrumentation" may be used herein to refer to code that has been added to an application to provide operational performance information about the application. Instrumenting an application is typically achieved by incorporating segments of code (explicit instrumentation) into the application's code at a plurality of locations. Typically, instrumentation is placed in an application's code at the "start" and "stop" of preselected scenarios, e.g., at a location in an application's code identifying that a user has clicked on a "preview" icon and at a location in and application's code identifying that a preview display has been rendered.

One limitation of in-application instrumentation is that scenarios are preselected. A developer must make their best guess at which process sequences or scenarios may encounter problems during operation of the application, and instrument those scenarios. Accordingly, after an application has been shipped, instrumentation may only be changed via an upgrade to the software.

One limitation of in-application instrumentation is that instrumentation added to software applications and information provided from the instrumentation are typically only known to the developer of the software. Although such instrumentation and its information may be useful to a company that develops the software, it may be unusable to others, e.g., a system developer or a developer of software to operate in cooperation with the company's software. Further, the software developer at the company that authored the application has no way to gather information about non-instrumented applications developed by the company, or about instrumented or non-instrumented applications developed by an independent software vendor.

Another limitation is that in-application instrumentation typically is targeted for pre-defined failure scenarios. The term "failure scenario" or "failure" is used herein to refer generally to unsatisfactory performance by an application, e.g., an unsatisfactory delay in performance, a glitch in an animation, video, or audio, a "hang," a "mini hang," a "freezing," a "ghosting," or a "crash." As noted above, instrumentation is typically placed at the start and end of selected scenarios. This can limit the usefulness of the instrumentation to only certain anticipated failure circumstances, and the instrumentation may not provide any useful information for unanticipated failure scenarios. Additionally, it may not be possible to gather more detailed information about the application's operation outside of a predefined failure scenario, e.g., what processes were being performed with the application prior to the failure scenario.

Further, in-application instrumentation may not be capable of providing a high-level view of a user's interaction with the application and other applications in operation on the same computing system at the time of a failure scenario. For example, in-application instrumentation may not be capable of providing information about what other applications the user was interacting with at the time of the failure, and how the user was interacting with the other applications.

The Applicants have appreciated the aforementioned limitations with existing performance-evaluation paradigms based on instrumented applications, and have developed a paradigm for evaluating operational performance of applications that does not rely on in-application instrumentation. The Applicants have recognized that selective monitoring of performance utilizing core responsiveness elements in a computer's operating system (OS) can provide useful information about performance of one or more non-instrumented applications, as well as instrumented applications, in operation on the computer. To this end, the Applicants have developed apparatus, methods, and infrastructure for an OS-based performance monitoring and evaluating system that is useful for applications having no explicit instrumentation. OS-based performance evaluation can overcome certain limitations of instrumented applications.

In one embodiment of the invention, at least one core responsiveness element may operate in a computer's or processor's operating system, and may be configured to monitor at least responsiveness of one or more applications in operation on the computer or processor. The at least one core responsiveness element may be external to the one or more applications. For example, a core responsiveness element may be external to application code authored by an application developer, and yet run in conjunction with the application. The at least one core responsiveness element may be further configured to provide information to a performance monitoring unit in operation on the computer or processor. The provided information, herein also referred to as "response events," may comprise data representative of at least responsiveness of the one or more applications. The at least one core responsiveness element may be configured to provide information to the performance monitor responsive to at least one trigger condition.

The performance monitoring unit may be configured to receive information (e.g., response events) from at least one core responsiveness element. The performance monitor may process the information to determine whether information received from at least one core responsiveness element meets a criterion. If the received information meets the criteria, the performance monitor may transmit a notification that reports the received information to a remote telemetry server. Analysis of the received information may be carried out automatically at the telemetry server, or by one or more operators having access to the telemetry server. Subsequently, a request for additional information may be sent from the telemetry server to the performance monitor. The request for additional information may specify conditions or performance triggers under which the performance monitor is to subsequently obtain and report to the telemetry server additional information from one or more core responsiveness elements. The telemetry server may be configured to receive reports from, and issue information requests to, a large number of computing systems hosting performance monitors. Statistics about an application's operational performance, measured for a broad base of installed applications and operated by different users on different and/or similar computing systems, may be compiled via the telemetry server.

In some embodiments, response events may be handled locally by a computer. For example, a computer may process response events as part of a self-diagnosis operation. The self diagnosis may be an automatic operation. A received response event may trigger a dialogue box for a user, to inform the user of a program status or to guide the user in subsequent operation of the program. Additionally, response events may be selected by a computer for storage in a run-time log that may provide a performance metric to a user. Logged response events may also be used by performance tools for analysis of operating system events such as context switches. In some implementations, a computer may automatically initiate restarting of an application based on received response events.

Further aspects and features of the invention will be described in greater detail below.

II. Computing System

FIG. 1 illustrates an example of a suitable computing system environment 100 on which embodiments of the invention may be implemented. The computing system environment 100 is only one example of a suitable computing environment and is not intended to suggest any limitation as to the scope of use or functionality of the aspects of the invention, as the aspects of the invention described herein can be used with any computing system. Neither should the computing environment 100 be interpreted as having any dependency or requirement relating to any one or combination of components illustrated in the exemplary computing environment 100.

FIG. 1 illustrates a general purpose computing device in the form of a computer 110. Components of computer 110 may include, but are not limited to, a processing unit 120, a system memory 130, and a system bus 121 that couples various system components including the system memory to the processing unit 120. The processing unit 120 may be a microprocessor. The system bus 121 may be any suitable bus structure, such as a memory bus or memory controller, a peripheral bus, and/or a local bus using any suitable bus architectures. By way of example, and not limitation, such architectures may include Micro Channel Architecture (MCA) bus, Video Electronics Standards Association (VESA) local bus, and Peripheral Component Interconnect (PCI) bus also known as Mezzanine bus.

A computer 110 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Computer 110 may include any one or more of a variety of manufactured computer readable storage media. In various embodiments, the computer readable storage media is non-transitory storage media. Computer readable storage media can be any suitable media that can be accessed by computer 110 and includes volatile and nonvolatile storage media, and removable and non-removable storage media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates an operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic storage media, a magnetic disk drive 151 that reads from or writes to a removable, nonvolatile magnetic disk 152, and an optical disk drive 155 that reads from or writes to a removable, nonvolatile optical disk 156 such as a CD ROM or other optical storage media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media, discussed above and illustrated in FIG. 1, may provide storage of computer readable instructions, data structures, program modules and/or other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A computer 110 may have one or more input and output devices. These devices may be used, among other things, to present a user interface. Examples of output devices that may be used to provide a user interface include printers or display screens for visual presentation of output and speakers or other sound generating devices for audible presentation of output. A user may enter commands and information into the computer 110 through input devices such as a keyboard 162 and pointing device 161, commonly referred to as a mouse, trackball or touch pad. Other input devices (not shown) may include a digitizing tablet, microphone, joystick, game pad, satellite dish, scanner, or the like. As another example, a computer may receive input information through speech recognition or in other audible format. These and other input devices may be connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using one or more logical connections to one or more remote computers, such as a remote computer 180. The remote computer 180 may be a personal computer, a server, a router, a network PC, a peer device or other type of network node, and may include many or all of the elements described above relative to the computer 110, although only a memory storage device 181 has been illustrated in FIG. 1. Examples of logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 may be connected to the LAN 171 through a network interface or adapter 170. When used in a WAN networking environment, the computer 110 may include a modem 172 or other component for establishing communications over the WAN 173, such as the Internet. The modem 172, which may be internal or external, may be connected to the system bus 121 via the user input interface 160, or other appropriate mechanism. It will be appreciated that the network connections shown are exemplary and other ways of establishing a communications link between the computers may be used.

In a networked environment, program modules, or portions thereof, depicted relative to the computer 110 may be stored in the remote memory storage device 181. By way of example, and not limitation, FIG. 1 illustrates remote application programs 185 as residing on memory device 181. The remote applications 185 may be accessed and placed into operation by the computer 110 via a network link.

Figure 2:
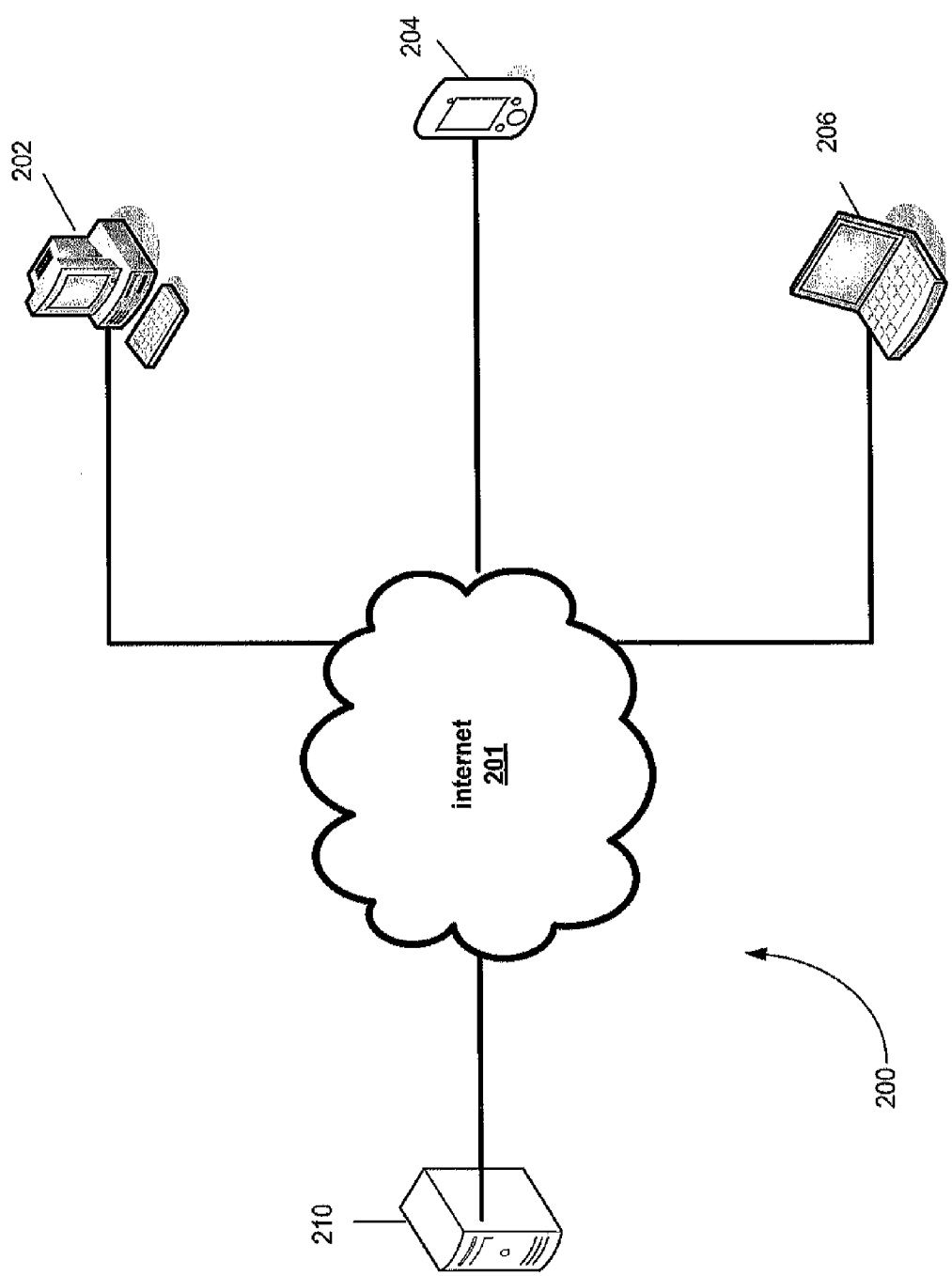
FIG. 2 depicts a computing environment in which embodiments of the invention may be implemented.

FIG. 2 illustrates a higher-level system configuration 200 in which the embodiments of the invention described herein may be implemented. The system 200 includes a number of computing devices 202, 204, and 206 (each of which may be configured as discussed above in connection with computer 110 or otherwise) and may be connected to one or more servers 210 via one or more communications media. In the illustrated example, the communications medium is the Internet 201, but any suitable communications medium or network may be used. The computing devices each may be any suitable computing device capable of executing computer instructions, such as a desktop computer 202, PDA 204, a laptop computer 206, etc. In the illustrated example, the system 200 includes a single instance of a number of different types of computing devices 202, 204 and 206, but the aspects of the invention described herein are not limited in this respect, and can be used to collect information from a single computer, a set of multiple homogeneous types of computers, and/or with any number of instances of any number of different types of computers executing one or more software applications.

In one embodiment, the computers coupled to the server 210 comprise all or a subset of an installed base for a software application loaded onto a plurality of computing devices. In this embodiment, each computing device having the software application loaded therein may include core responsiveness elements and a performance monitor for monitoring operational performance of at least one application. As outlined above, in one embodiment of the invention, each computing device may process and report information from at least one core responsiveness element to a remote telemetry server, e.g., server 210. The information reported may relate to how at least one application responds to a particular user interaction, e.g., clicking on a selected menu item, but the invention is not limited to reporting only this type of information.

A telemetry server, e.g., sever 210, adapted to receive information from a performance tracking unit in one or a plurality of computing devices, may be owned or controlled by the provider of the software application for which performance evaluation is desired. For example, when the computers 202, 204, 206 include the installed base (or subset thereof) for a software application provided by a software vendor, the telemetry server 210 may be owned and/or controlled by the software vendor. In some implementations, the telemetry server 210 is owned by a developer and/or manufacturer of an operating system. The telemetry server may also be used to collect data from the installed base for various reasons relating to performance evaluation.

The server 210 may be implemented as a single computer server, or as multiple computer servers configured in any manner (e.g., configured to act as a cohesive system). If server 210 is implemented as multiple computer servers, the multiple servers may be configured in any suitable way. For example, each server in the system may perform a different type of processing, or all the servers may perform the same type(s) of processing but be distributed in such a way as to balance the processing load on any one server. Alternatively, a combination of either approach may be used, e.g., groups of servers may be configured to handle one or more types of processing tasks, and loads balanced among the group. Additionally, other embodiments of the invention may include multiple servers operating independently, such as minor sites for a single software provider, or multiple servers from a number of different software or hardware providers.

III. Embodiments of the Invention

Figure 3:
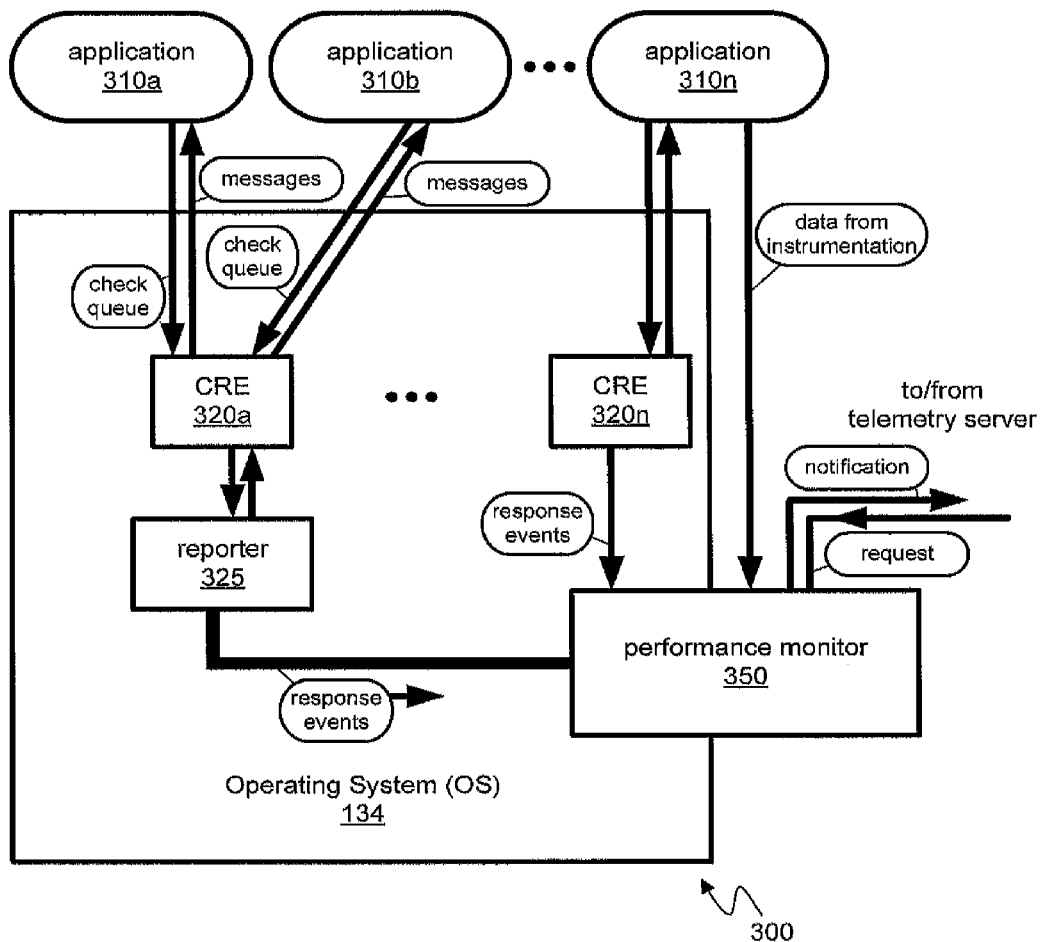
FIG. 3 is a block diagram illustrating components of a performance measuring system in accordance with one embodiment of the invention.

FIG. 3 depicts, in a block diagram, various components of a computing system 300 configured for monitoring and evaluating performance of applications according to one embodiment of the invention. A computing system configured for monitoring performance of applications may include at least one core responsiveness element (CRE) 320a . . . 320n and a performance monitor 350. In some embodiments, at least one reporter 325 may further be included. The computing system 300 may operate with an operating system (OS) 134, and one or more applications 310a, 310b . . . 310n may be in operation on the computing system 300. The performance monitor 350 may be in communication with a remote telemetry server (not shown in the figure).

Although FIG. 3 depicts a performance monitor 350 as part of the system, in some embodiments the performance monitor is optionally included. The CRE comprises a source of data that may be used by the computing system 300 directly, without being handled by a performance monitor. In some embodiments, response events from at least one CRE may be exported via a network link to a remote system for analysis.

A core responsiveness element 320a may comprise any type and form of computer-ware configured to execute the functionality of the CRE. The term "computer-ware" is used herein to refer to software, firmware, hardware, or any combination thereof that may be used for adapting a computing system having one or more processors to operate in a selected manner. When referring to software, computer-ware may be used to refer to computer-readable instructions that, when executed by at least one processor, cause the at least one processor to execute one or more process steps according to the functionality for which the software was designed.

In some implementations, there may be one core responsiveness element (CRE) 320a operating as part of the operating system 134. In other embodiments, a plurality of core responsiveness elements 320a . . . 320n may operate as part of the operating system 134. At least one CRE may be in communication with one reporter 325, a plurality of reporters, the performance monitor 350, or any combination thereof. FIG. 3 shows a CRE 320a in communication with a reporter 325 and a CRE 320n in direct communication with the performance monitor 350. A CRE may also be in communication with one or more applications 310a . . . 310n. Communication links associated with a CRE may be bidirectional, or any communication link may be unidirectional. In various embodiments, the core responsiveness elements 320a . . . 320n are external to the applications 310a . . . 310n.

There may be one or more types of CREs in operation on the computing system 300 that may be adapted for use in a performance monitoring system. A CRE may be any component in, or associated with, an OS 134 configured to provide any type and form of interaction with one or more applications 310a, 310b . . . 310n, e.g., indicate a measure of responsiveness of the one or more applications. As one example, a CRE may comprise computer-ware associated with a message pump in an OS 134 that queues messages to one or more applications. The queued messages may be commands resulting from user input that will initiate at least one actionable event in the one or more applications, e.g., a command resulting from a user clicking on a menu item or entering a control key sequence for a particular application. As a second example, a CRE may comprise computer-ware associated with a wait cursor, e.g., an hour glass or blue donut. As a third example, a CRE may comprise computer-ware associated with the monitoring of component object model (COM) calls executed in a computing system.

Continuing with the example of a message pump as a CRE, there may be code in an operating system associated with the message pump that can be adapted for use with the performance monitoring methods and systems of the present invention. For example, Windows 7 includes an "InputCheckDelay" routine that reports the failure to process a message queued for at least 200 ms when it is known by an application that there is input pending in the queue. The InputCheckDelay may be used in the performance monitoring system to identify a busy time of an application. Windows 7 includes a "MessageCheckDelay" that reports the failure to check the message queue for new messages within 200 ms. The MessageCheckDelay may be used in the performance monitoring system to identify a stalled time or frozen time of an application. In some embodiments, the CREs and/or related routines may be instrumented to provide operational performance information to a performance monitor 350 about at least one application that interacts with a CRE and or related routine, as described in greater detail below.

A core responsiveness element 320a may be generic to a plurality of applications. For example, a message pump functioning as a CRE may handle messages to a plurality of applications developed by a common entity or developed by different entities. In some implementations, a CRE 320a may be specific to a single application, and configured to interact with only that single application.

A reporter 325 may comprise any type and form of computer-ware configured to execute the functionality of the reporter. In various embodiments, the reporter 325 monitors activity of at least one core responsiveness element 320a. The reporter 325 may process data received and/or obtained from a CRE to evaluate at least one performance figure of merit for at least one application. The reporter 325 may include at least one trigger condition, and be configured to compare the at least one performance figure of merit with the trigger condition. If the reporter 325 determines that the performance figure of merit fails to meet the trigger condition, the reporter may be configured to provide data (e.g., data representative of response event information) to the performance monitor 350, wherein the data at least represents that the application has failed to meet the trigger condition. In some embodiments, a portion of or all of the functionality of a reporter 325 may be instrumented into a core responsiveness element 320a . . . 320n.

The term "trigger condition" is used to refer to a performance criteria or threshold condition indicative of a boundary between an acceptable level of performance for a specified operational aspect of a selected application and an unacceptable level of performance for the operational aspect. Examples of a failure of an application to meet a performance criterion can include "freezing" by the application, a required re-launching of the application, or delayed responsiveness by the application, e.g., hanging up or mini hangs. As a more specific example, a trigger condition of 200 milliseconds (ms) may be used to specify an acceptable amount of time for an application to execute an action responsive to user input, e.g., display a "preview" of a page to be printed responsive to a user clicking on a "preview" icon. In this example, the reporter 325, or an instrumented CRE 320n, would provide data to the performance monitor 350 when an application took longer than 200 ms to display a "preview" page. Additional examples of trigger conditions include, but are not limited to, display of a wait cursor by an application (e.g., was a wait cursor displayed or not), and timing out in response to a COM call (e.g., was a "time out" notice displayed to the user).

The reporter 325, or an instrumented CRE 320n, may include further data (e.g., response event metadata) in the report to the performance monitor 350 in addition to data representing that the application has failed to meet performance criteria. The response event metadata may be representative of any type of information about operational aspects of the application that failed to meet the performance criteria. For example, the metadata may include data representing the amount of time the application was busy after retrieving a message from a message queue in the CRE 320a. The metadata may include data representing any combination of the following items: a failure scenario identification, duration of the failure scenario, time since booting of the computer, time since resuming operation of the computer, time since logon by a user, state of the operating system, a reference time value (GMT), a date, a class name for a top window displayed to a user, a class name for a focused window, window text for the top window, window text for the focused window, menu identification, foreground status, window parameters (WPARAM), message identification, program identification, flag identifications and their values, and a process name.

In some implementations, an instrumented CRE 320n or a reporter 325 may be configured to report data relating to any one of a variety of types of performance delays. Returning to the example in which a message pump is used, there may be several types of delays identified with regard to the message pump. For example, there may be a delay between retrieval, by an application, of a first message from a message queue of a message pump and retrieval of a subsequent message from the queue by the application. There may be a delay between retrieval, by an application, of a first message from a message queue of a message pump and a time at which the application checks for a subsequent message in the queue. There may be a delay between a time at which an application checks for a message in the queue and a time at which the application retrieves the message for processing. Any of these delays, their variation, and/or combination may be reported to the performance monitor.

As noted above, in some embodiments the CREs 320a . . . 320n may be instrumented (e.g., computer-ware added to the CREs), so that they include a portion of, or all of, the functionality of a reporter. For example, CRE 320n may be instrumented to include all the functionality of a reporter 325 so that CRE 320n communicates directly with performance monitor 350. Trigger conditions or performance criteria for the reporters 325 or instrumented CREs 320a . . . 320n may be specified at development time of the operating system 134.

In some embodiments, a portion of, or all of, the functionality of a reporter 325 or a CRE 320a . . . 320n may be included as part of the performance monitor 350. For example, instrumented CREs 320n or reporters may be added to or provided as part of the computer-ware for the performance monitor 350.

The performance monitor 350 may comprise any type and form of computer-ware configured to execute the functionality of the performance monitor. In some implementations, the performance monitor may be part of the operating system 134, e.g., a component fully contained within the operating system. In some implementations, the performance monitor 350 may be external to the OS 134. For example, the performance monitor may be an application operating in conjunction with the OS 134. In some implementations, the performance monitor 350 may run in conjunction with an underlying framework, e.g., a .NET framework. In some embodiments, some components of the performance monitor may be part of the operating system and some components of the performance monitor may be external to the operating system, as depicted in FIG. 3.

The performance monitor 350 may be configured for operation on at least one processor of the computing system 300, and further configured to receive a plurality of reports (response events) from at least one reporter 325 and/or at least one instrumented CRE 320n. Each response event may comprise data representative of information relating to operational performance of an application 310b in operation on the computing system. Each response event may include response event metadata as described above.

In some implementations, the performance monitor 350 is configured to process the received response events, and determine whether a response event, or a portion thereof, identifies at least one failure of an application to meet a performance criteria. The performance criteria may be a trigger condition or threshold value indicative of an acceptable level of performance for a specified operational aspect of a selected application, as described above. If the performance monitor 350 determines that a response event, or portion thereof, identifies a failure scenario, then the performance monitor 350 may determine whether the failure scenario is of such severity that a notification will be transmitted to a remote telemetry server reporting the response event, or portion thereof. The performance monitor 350 may be configured to filter data received from a reporter 325 or instrumented CRE 320n, so that not all data received by the performance monitor is reported to the telemetry server in response to a response event identifying a failure of an application to meet a performance criteria. For example, a response event may be issued to the performance monitor whenever a delay of more than 200 ms is detected by a CRE. However, the performance monitor may include "performance triggers" for an application specifying that only delays between 500 ms and 1 second are to be reported to the telemetry server.

In some implementations, the performance monitor 350 may be configured to report every response event received from a reporter 325 or instrumented CRE 320n. In such an implementation, there may be no testing of response events against a performance criteria or performance trigger by the performance monitor 350. Accordingly, the performance monitor may simply forward response events, or portions thereof, to the telemetry server.

Prior to sending data to the telemetry server, the performance monitor 350 may filter any data received from a CRE 320a. Filtering characteristics may be provided at the performance monitor 350, so that only a portion of data from a CRE is forwarded, or processed and forwarded, to the telemetry server. Filtering of data at the performance monitor 350 can assist in reducing the total volume of data received by a telemetry server.

An advantageous aspect of the performance monitor 350 is that its filtering policies and performance criteria or performance triggers may be modified at any time and established by an external source, e.g., set by a user via the telemetry server. This aspect of the invention, described further below, enables flexible and targeted collection of information relating to an application's operational performance.

In some embodiments, the performance monitor 350 may be further configured to receive data directly from at least one instrumented application 310*n*, as depicted in FIG. 3. The performance monitor may also filter and/or process data received from an instrumented application, and include the data and/or processed data, or a portion thereof, in a notification transmitted to a telemetry server.

Some embodiments of the invention are contemplated to operate with non-instrumented as well as instrumented applications. Referring again to FIG. 3, at least one application 310*n* may be instrumented, and configured to provide data from its explicit instrumentation to the performance monitor 350. This data may be provided, by the performance monitor, to the telemetry server, e.g., provided in a trace for application 310*n* in addition to response event data.

Although the performance monitor 350 is shown as part of a computing system 300 in FIG. 3, in some embodiments, the performance monitor may be remote from the computing system 300 and in communication with the computing system 300 through a network link, e.g., a local area network link. In such an embodiment, the performance monitor 350 may service more than one computing systems.

Although many embodiments described above include core responsiveness elements 320*a* . . . 320*n* and optionally a performance monitor 350 that are based on a computing system's operating system 134, the CREs and performance monitor may be based on any suitable underlying framework, e.g., a .NET framework.

Figure 4:
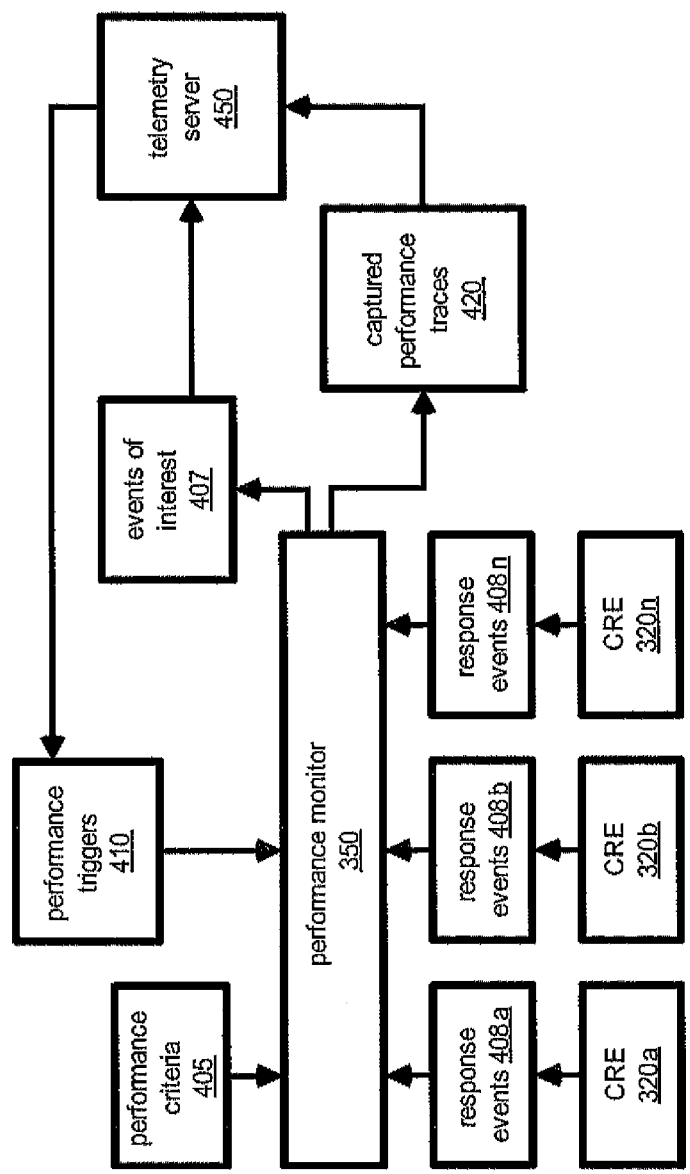
FIG. 4 illustrates data flow in accordance with one embodiment of the invention.

FIG. 4 depicts an architectural overview of a performance monitoring and tracking system according to one embodiment of the invention. The lines and arrows in the diagram are for illustrational purposes to portray communication links, and are not intended to define unidirectional data flow. Some of the communication links may be unidirectional and some may be bidirectional. Although FIG. 4 shows a telemetry server 450 coupled to one performance monitor 350, in practice a telemetry server 450 may be coupled to a plurality of performance monitors, e.g., coupled to thousands or more performance monitors via the Internet, and may further be in communication with one or more telemetry servers.

According to the embodiment of FIG. 4, instrumented core responsiveness elements 320*a* . . . 320*n* provide data, identified as response events 408*a* . . . 408*n*, to the performance monitor 350. As described above, the response events may be transmitted to the performance monitor when an application fails to meet a performance criterion. The performance monitor 350 may process and/or filter the received response events, and transmit at least one notification 407 to the telemetry server 450. The at least one notification may comprise information identifying an application that failed to meet a performance criteria 405 specified for the application. The notification may include any additional data relating to the response event that triggered the transmission of the notification. For example, the notification 407 may include any portion of the metadata that may be included with a response event as described above.

The telemetry server 450, may receive a plurality of notifications 407 for one or more applications. The notifications may be received from a single computing system or a broad base of computing systems hosting the one or more applications. Processing of the notifications may be carried out via the telemetry server. In some implementations, the telemetry server 450 may automatically process the received notifications to tally a number of instances of identical failure notifications by application for which a notification was received. The telemetry server may be configured to issue a "program performance" notice to a system user or administrator when a number of instances of identical failure notifications for any one application exceeds a selected value, e.g., 50 instances, 100 instances, 200 instances, 500 instances, 1000 instance, or any larger value.

The telemetry server 450 may be configured to issue a request 410 specifying at least one performance trigger back to at least one performance monitor 325. As described above, the request 410 may be responsive to one or more notifications 407 received from at least one performance monitor 350. A performance trigger specified in the request 410 may change, delete, replace, or add to previously specified performance criteria 405 used by the performance monitor. The request may further include one or more filtering rules that alter at least one filtering characteristic implemented by the performance monitor with respect to the filtering of response events. The request may further identify one or more applications to which the specified performance triggers and filtering rules of the request apply. Performance triggers specified in the request 410 may be selected automatically by the telemetry server 450, e.g., selected from stored memory, or they may be specified by user or administrator input. The transmission of performance triggers and filtering rules in a request 410 back to at least one performance monitor permits flexible and targeted collection of information relating to an application's operational performance.

At least one performance monitor 350 may receive the request 410 from the telemetry server, and modify any trigger conditions and filter characteristics for at least one identified application in accordance with the received request. Responsive to the request, the at least one performance monitor 350 may return one or more captured performance traces 420 in a second sampling of data to the telemetry server 450. The captured performance traces 420 may provide further information, e.g., additional metadata as described above, relating to operational performance of an identified application.

In some embodiments, the performance traces 420 may include additional data, e.g., data relating to the computing environment in which an application is operating. For example, a performance trace 420 may include data identifying a number and/or type of other applications being serviced by a CRE at the same time as servicing of an application for which a response event is initiated. A performance trace 420 may include data identifying a number and/or type of other windows displayed to a user at the time a response event is initiated. A performance trace 420 may include data identifying what window or application has focus at the time a response event is initiated, or may identify a history of changing window or application focus. A performance trace 420 may include data identifying what processes of applications have been initiated at the time a response event is initiated or just prior to initiation of a response event. A performance trace may further include rich data representative of the computing environment including, but not limited to, resource usage by computing components (CPU, disk, GPU, etc.) as well as specifics of threads of execution, with stacks on waits, etc. A performance trace may include data identifying software components utilizing system resources. A performance trace may include data identifying events fired by the CREs with timestamps, such that the fired events can be correlated with resource utilization information. A performance trace may include data identifying custom events fired by any component in the computing system. A performance trace 420 may also include data from instrumented applications 310*n*.

It will be appreciated that a rich and useful amount of targeted information can be obtained in a performance trace 420 for one or more applications, instrumented or non-instrumented, by specifying performance triggers and filter characteristics and utilizing information provided from core responsiveness elements 320a . . . 320n that are external to the applications, in accordance with embodiments of the invention. Such targeted and rich information gathering may not be possible in a system that uses instrumented applications only.

Data provided to the telemetry server 450, e.g., notifications 407 or performance traces 420, may be subsequently analyzed to determine the seriousness of a failure scenario and what further actions should be taken. At least a portion of the analysis of data provided to the telemetry server may be automated in some embodiments. In some implementations, at least a portion of the analysis may be carried out off-line, e.g., by one or more software engineers.

Figure 5:
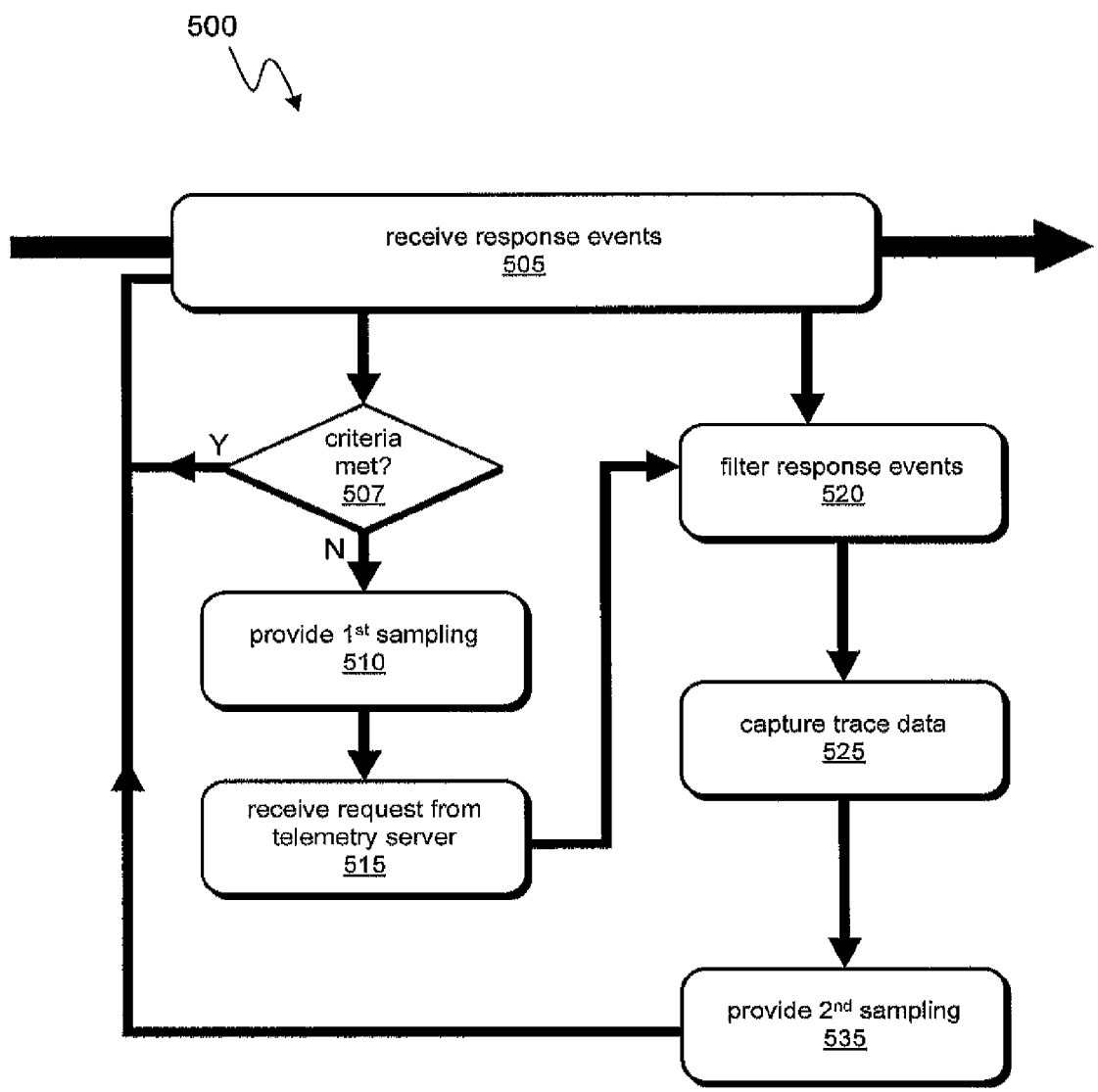
FIG. 5 is a flow diagram illustrating a method of monitoring performance of at least one application in operation on at least one processor in accordance with an embodiment of the invention.

FIG. 5 illustrates a flow diagram of a process 500 according to one embodiment of the invention. The flow diagram is illustrated from the perspective of the performance monitor 350. The process comprises an act of receiving 505 response events from at least one instrumented core responsiveness element 320a or reporter 325. The performance monitor may be configured to continuously receive 505 response events while the computing system 300 is in operation. The performance monitor 350 may initiate storage of all, a portion of, or none of, the received response events.

The exemplary process 500 further comprises determining 507 whether a performance criteria has been met for at least one application. If it is determined that a performance criteria has not been met for the at least one application, the performance monitor may provide 510 a first sampling of data to the telemetry server 450. The first sampling of data may be a notification as described above, and identify the at least one application (e.g., include a program or application ID) as failing to meet a performance criteria.

The process may further comprise receiving 515 a request from a telemetry server. The request 410 may specify performance triggers and filter characteristics that are to be modified at the performance monitor for at least one identified application. The process may further include filtering 520 response events received by the performance monitor and capturing 525 trace data in accordance with the performance triggers and filter characteristics specified in the request 410. As an example, a request 410 may include appropriate computer-readable instructions to specify filtering and reporting a response event for an application (e.g., "App-X" identified by a program ID) in the following manner: when a response event identifies that App-X exceeds 400 ms in retrieving a message from a message pump queue, return a list of all messages in the message pump queue and the prior 20 messages in the queue, and return values for date, time, time since boot, App-X's class name for top window, App-X's name for focused window, and App-X's process name.

The data compiled by the performance monitor may be provided 535 to the telemetry server in a second sampling. The second sampling may comprise at least one performance trace including data as described above in connection with a performance trace 420. The second sampling may comprise a performance trace that includes filtered metadata from one or more response events for the application, filtered data from one or more response events for other applications in operation at the time of a failure scenario, data provided from instrumentation within any instrumented applications in operation on the computing system, or any combination of the foregoing data.

Analysis of data returned to the telemetry server can provide a variety of useful information to assist a software developer. Included in the useful types of information that may be obtained with the performance monitoring system of the present invention are (a) a frequency of failure scenarios for an application, (b) a breakdown of which user interaction scenarios were affected by the failure scenarios, and (c) the severity of impact (e.g., delay time, re-launch, reboot) experienced during the different scenarios. It is noteworthy that such information may be gathered about applications containing no explicit instrumentation, and applications developed by independent software vendors that disclose no details of their source code.

The operating-system-based performance monitoring system of the present invention may be used to evaluate other aspects of applications in addition to responsiveness attributes. For example, the performance monitoring system may be used to evaluate performance of "busy bars" in a computing system. The performance monitoring system may be used to evaluate the progression of progress bars, e.g., determine whether they stall or progress continuously. In some implementations, the performance monitoring can be used to evaluate behavior of an application during launch and exit.

From the foregoing description it can be appreciated that the performance monitoring system of the present invention provides a method for discovering, in a generic manner, failure scenarios for an application and subsequently determining an extent and severity of one or more types of the failure scenarios. This method comprises automatically receiving, by at least one telemetry server 450, generic notifications 407 that an application fails to meet at least one performance criteria. A generic notification may identify only that a performance criteria was not met and an application ID for the purposes of minimizing the amount of data that a telemetry server receives. Analysis of the generic notifications may result in issuance of a request 410 that specifies performance triggers and/or filtering characteristics for the performance monitor 350, so that further detailed information can be obtained. Resulting data samplings (e.g., data comprising additional response event metadata, performance trace data, data from instrumented software) may be analyzed to determine an extent and severity of one or more of the failure scenarios, or to issue one or more additional requests 410 tailored to evaluate one or more failure scenarios. In some embodiments, the method is carried out for applications 310a that include no instrumentation.

IV. Example Implementation

An operational example of the performance tracking system is provided to illustrate operational aspects, usefulness, and advantages of the performance monitoring system, and is not intended to limit the invention in any way. The example encompasses only one implementation, and it will be appreciated that many additional implementations are possible with the performance monitoring and tracking system.

In this example, a telemetry server 450 may receive a plurality of notifications 407 from a plurality of performance monitors 350 in operation on a plurality of computing systems 100. The telemetry server may be configured to sort the notifications into N bins, each for one of N different applications placed in operation on the computing systems. For purposes of this example, it will be assumed that there are N=4 different applications ("W," "X," "Y," and "Z") placed in operation on the computing systems.

The telemetry server may, after a specified period of time (e.g., 24 hours), record that there are 51 notifications indicating W failed to meet at least one performance criteria, 8 notifications indicating X failed to meet at least one performance criteria, 637 notifications indicating Y failed to meet at least one performance criteria, and 39 notifications indicating Z failed to meet a performance criteria. For purposes of this example, and not to limit the invention in any way, the notifications 407, or subsequent traces 420, from the performance monitors may comprise data that identifies an application that has failed, a failure or scenario duration, and an operation called just prior to the failure. Further, the telemetry server may be configured to issue a "program performance" notice to a system user or administrator having access to the telemetry server when more than 50 notifications are received identifying the same application in the specified period of time. In this example, program performance notices would be issued for applications W and Y.

The telemetry server may further be configured for sub-binning of the notifications. Continuing with the example, the notifications 407 for each application W, X, Y, and Z may further be sub-binned into n sub-bins, wherein each sub-bin is associated with an operation called just prior to the application's failure to meet a performance criteria. Also, the notifications may be sub-binned for each application by failure duration. Binning and/or sub-binning enabled by data provided from core responsiveness elements can be highly advantageous in trouble-shooting applications as the following scenario illustrates.

Binning and sub-binning may be done in any suitable manner for analyzing the notifications 407. For example, binning and sub-binning may be based on metadata included with a notification. Binning and sub-binning may be based on operations called by applications. The operations may be defined by data included in the notifications 407. For example, an operation may be defined by a classname called by an application and a windows message.

For the applications W and Y in this example, the telemetry server may determine that for application W an identical operation "W-p1" was called just prior to failure of the application for 43 of the 51 notifications, and for application Y, an identical operation "Y-p1" was called just prior to failure of the application for 459 of the 637 notifications and that no other operation resulted in failure for more than 12 of the 637 notifications. Further, sub-binning may also reveal that 41 of the 43 notifications for operation W-p1 were associated with a failure duration of more than 3 seconds, and that 612 of the 637 notifications for operation Y-p1 were associated with a failure duration between 200 ms and 800 ms, and that the remaining 25 notifications for operation Y-p1 were associated with a failure duration of not more than 2 seconds.

Results of the binning and sub-binning may affect prioritization of debugging the applications W and Y. In this example, based on the first binning results, a developer may wish to focus efforts on debugging application Y first. However, when looking at the sub-bin results, a developer may see that operation W-p1 should receive top priority in debugging.

As described above, the performance monitoring and tracking system enables targeted collection of additional data via performance triggers sent back in a request 410 to performance monitors 350. Additional data can further affect prioritization of debugging efforts as described below.

Continuing with the example of applications W, X, Y, and Z, applications X, Y, and Z may have been developed by a major software vendor and application W may have been developed by an independent vendor. An advantageous aspect of the invention is that operational performance data can be collected about the independent vendor's application W, by the major software developer with limited knowledge of the application W or any instrumentation that may be included within the application W. Similarly, the independent vendor can obtain operational performance data about application Y. For purposes of this example, it is assumed that the independent vendor developed application W to run in cooperation with application Y.

The major software vendor may, via telemetry server, issue a request 410 with performance triggers to target further information in connection with failures of operation Y-p1. The request may comprise data that adapts the performance monitors to return additional samplings of data, e.g., specifically filtered response events and/or tailored performance traces. The additional samplings may include window focus data for applications W and Y. A subsequent analysis of window focus data may show that for the 41 instances in which operation W-p1 exhibited a failure of more than 3 seconds, a window for application W was not in focus. In this case, the user may be unaware and untroubled by a delay in application W. Accordingly, debugging efforts may be prioritized to first address operation Y-p1.

It will be appreciated from the foregoing example that the performance monitoring and tracking system of the present invention provides a useful diagnostic tool for obtaining and analyzing operational performance of applications placed in operation on a plurality of computing systems. Statistics can be generated for applications as well as for sub-operations or failure scenarios for each application type. Targeted performance traces and additional performance data samplings can be obtained via specific requests issued from a telemetry server. The specific requests may be formulated by a software-development entity to obtain more detailed information useful for analyzing failure scenarios and prioritizing debugging efforts so as to achieve a maximized return on effort for the benefit of an application user.

Although this example describes an embodiment comprising one telemetry server 450, in some embodiments, there may be a plurality of telemetry servers (e.g., a telemetry server farm). A telemetry server farm may be accessible to one or more entities that perform comprehensive data analysis of performance data received by servers in the telemetry server farm. In some implementations, there may be no remote telemetry server, and response events and performance traces may be handled and processed locally by the computing system 300, e.g., for self-diagnosis of performance.

V. Conclusion

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention may be implemented in any of numerous ways. For example, the embodiments may be implemented using hardware, software or a combination thereof. When implemented in software, the software code may be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media may be transportable, such that the program or programs stored thereon may be loaded onto one or more different computers or other processors to implement various aspects of the present invention as discussed above. As used herein, the term "non-transitory computer-readable storage medium" encompasses only a computer-readable medium that may be considered to be a manufacture (i.e., article of manufacture) or a machine.

The terms "program" or "software" are used herein in a generic sense to refer to any type of computer code or set of computer-executable instructions that may be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system comprising:
   at least one instrumented core responsiveness element of an operating system external to at least one application and configured to provide an interaction with the at least one application, the instrumented core responsiveness element configured for operation on at least one processor and further configured to provide at least one response event to a performance monitor responsive to at least one trigger condition indicating an unacceptable level of performance, the at least one response event comprising data representative of operational performance of the at least one application; and
   the performance monitor configured for operation on the at least one processor, the performance monitor further configured to:
      receive a plurality of response events from the at least one instrumented core responsiveness element;
      process the plurality of response events; and
      provide a notification based on the processing of the plurality of response events, the notification identifying that the at least one application failed to meet a performance criterion.

2. The system of claim 1, wherein the notification includes data representative of a failure scenario of the at least one application in responding to an actionable event for the at least one application.

3. The system of claim 1, wherein the at least one application contains no explicit instrumentation and the performance monitor is further configured to:
   provide the notification to a telemetry server;
   receive a request from the telemetry server responsive to the notification; and
   provide performance trace data to the telemetry server.

4. The system of claim 3, wherein the request received from the telemetry server identifies at least one filtering rule, the at least one filtering rule identifying conditions under which additional response events relating to the at least one application are to be captured and processed by the performance monitor and provided to the telemetry server.

5. The system of claim 3, wherein the performance trace data comprises information relating to the computing environment in which the at least one application operates.

6. The system of claim 3, wherein the at least one instrumented core responsiveness element is configured to operate as part of the operating system for the at least one processor and to provide information to the performance monitor relating to messaging activity of at least one message pump of the operating system.

7. The system of claim 6, wherein the information relating to messaging activity comprises information about the amount of time elapsed between a first retrieving, by the at least one application, of a first message from the message pump and checking, by the at least one application, for a subsequent message from the message pump.

8. The system of claim 3, wherein the telemetry server is remote from the performance monitor and services a plurality of performance monitors.

9. The system of claim 1, wherein the at least one instrumented core responsiveness element is configured to:
   determine whether an event monitored by the at least one instrumented core responsiveness element meets a criterion; and
   provide the at least one response event to the performance monitor if it is determined that the event monitored fails to meet the criterion.

10. A method for monitoring performance of at least one application in operation on at least one processor, the method comprising:
   receiving, by a performance monitor in operation on the at least one processor, a plurality of response events responsive to at least one trigger condition indicating an unacceptable level of performance from at least one core responsiveness element of an operating system external to the at least one application and configured to provide an interaction with the at least one application, wherein at least some of the plurality of response events comprise information relating to operational performance of the at least one application;
   providing, by the performance monitor, a first sampling of the response events;
   receiving, by the performance monitor, a request;
   receiving, by the performance monitor, additional response events from the at least one core responsiveness element; and
   providing, by the performance monitor, a second sampling of response events responsive to the request, wherein the second sampling comprises filtered data from at least one of the additional response events.

11. The method of claim 10, wherein the at least one application does not include explicit instrumentation for evaluating operational performance of the at least one application.

12. The method of claim 10, wherein at least one response event of the first sampling of the response events includes data representative of a failure scenario of the at least one application in responding to an actionable event for the at least one application.

13. The method of claim 10, further comprising:
   processing, by the performance monitor, at least one of the plurality of response events;
   determining, by the performance monitor based upon the act of processing, whether the at least one of the plurality of response events meets a criterion; and
   executing the act of providing a first sampling of the response events if it is determined that the at least one of the plurality of response events fails to meet the criterion.

14. The method of claim 10, wherein the request is received from a telemetry server and identifies at least one filtering rule, the at least one filtering rule identifying conditions under which additional response events and/or trace data relating to the at least one application are to be captured and processed by the performance monitor and provided to the telemetry server.

15. The method of claim 10, further comprising providing, by the performance monitor, trace data with the second sampling of response events, wherein the trace data comprises information relating to the computing environment in which the at least one application operates.

16. The method of claim 10, wherein the at least one core responsiveness element is configured to provide information to the performance monitor about messaging activity of at least one message pump of the operating system.

17. The method of claim 10, further comprising:
   determining, by the at least one core responsiveness element, whether an event monitored by the at least one core responsiveness element meets a criterion; and
   providing, by the at least one core responsiveness element, data representative of the event monitored to the performance monitor if it is determined that the event monitored fails to meet the criterion.

18. Manufactured computer-readable storage medium comprising:
   computer-executable instructions that, when executed by at least one processor, adapt the at least one processor to perform acts comprising:
   receiving, by a performance monitor in operation on the at least one processor, a plurality of response events responsive to at least one trigger condition indicating an unacceptable level of performance from at least one instrumented core responsiveness element of an operating system on the at least one processor configured to provide an interaction with at least one application, wherein at least some of the plurality of response events comprise information relating to operational performance of the at least one application adapted for operation on the at least one processor;
   providing, by the performance monitor, a first sampling of the response events;
   receiving, by the performance monitor, a request;
   receiving, by the performance monitor, additional response events from the at least one instrumented core responsiveness element; and
   providing, by the performance monitor, a second sampling of response events responsive to the request, the second sampling including information relating to operational performance of at least one application, wherein the at least one application does not include explicit instrumentation for evaluating operational performance of the at least one application.

19. The computer-readable storage medium of claim 18, wherein the request is received from a telemetry server and identifies at least one filtering rule, the at least one filtering rule identifying conditions under which additional response events and trace data relating to the at least one application are to be captured and processed by the performance monitor and provided to the telemetry server.

20. The computer-readable storage medium of claim 18, further comprising instructions that adapt the at least one processor to perform acts comprising providing, by the performance monitor, trace data with the second sampling of response events, wherein the trace data comprises information relating to the computing environment in which the at least one application operates.

* * * * *